United States Patent [19]

Kim et al.

[11] Patent Number: 5,760,943
[45] Date of Patent: Jun. 2, 1998

[54] FACET TRACKING CORRECTION SYSTEM FOR LASER SCANNERS

[75] Inventors: Douglas Yongshik Kim, Poughkeepsie; Karl Otto Muggenburg, Salt Point; Kurt Richard Muller, Hopewell Junction, all of N.Y.

[73] Assignee: International Business Machines Corporation, Armonk, N.Y.

[21] Appl. No.: 672,884

[22] Filed: Jun. 28, 1996

[51] Int. Cl.⁶ .................................................. G02B 26/08
[52] U.S. Cl. .......................... 359/208; 359/205; 359/207; 347/260
[58] Field of Search .................................. 359/196, 197, 359/205, 206, 207, 208, 215; 235/467, 470; 250/236; 347/256, 260

[56] References Cited

U.S. PATENT DOCUMENTS

| | | |
|---|---|---|
| 3,750,189 | 7/1973 | Fleischer. |
| 4,123,135 | 10/1978 | Rabedeau. |
| 5,168,386 | 12/1992 | Galbraith ............... 359/215 |
| 5,666,220 | 9/1997 | Sakuma ............... 359/208 |

*Primary Examiner*—Paul M. Dzierzynski
*Assistant Examiner*—Darren E. Schuberg
*Attorney, Agent, or Firm*—DeLio & Peterson, LLC; Peter W. Peterson; Aziz M. Ahsan

[57] ABSTRACT

An optical system for a beam scanning apparatus comprises a laser beam, a cylindrical first lens, a scanning mirror rotatable about an axis for deflecting and scanning the focused energy beam and a concave, toroidal mirror adapted to deflect the focused energy beam from the rotating mirror and collimate the beam. The toroidal mirror has a radius in a major axis equal to the focal length of the first lens and a radius in a minor axis equal to twice the focal length of the first lens, and is spaced from the first mirror a distance equal to the focal length of the first lens. Preferrably, the axis of rotation of the scanning mirror is non-orthogonal with respect to the direction of the beam from the first lens.

19 Claims, 2 Drawing Sheets

FACET TRACKING CORRECTION SYSTEM FOR LASER SCANNERS

BACKGROUND OF THE INVENTION

1. Field of the Invention

The present invention relates generally to a system and method for scanning a beam of low or high radiant energy and, in particular, to a system and method for correcting the accuracy of a laser beam during scanning of a workpiece.

2. Description of Related Art

Systems have long utilized rotating mirror line scanning apparatus in order to scan a laser beam or other high or low radiant energy beam onto a workpiece for various purposes including data collection, photolithography, photoengraving and machining, for example, punching holes and cutting workpieces. One example of such a system is disclosed in U.S. Pat. No. 4,123,135 to Rabedeau, assigned to the assignee of the present invention, which discloses a lens system for scanning a laser beam in an electrophotographic system. According to the '135 patent, a lens system is utilized to image a rotating mirror surface on the scan plane in an azimuth perpendicular to the plane of deflection of the beam while bringing the collimated rays of the energy source in the plane of deflection of the beam to focus in one and the same scan line. In order to achieve the necessary difference in lens power in the two normally located azimuths, and to flatten the field of the focused scanning beam, a negative cylindrical optical element with its axis perpendicular to the plane of deflection is used in conjunction with positive spherical or positive spherical and cylindrical elements. This system is known as a "passive" correction system and is useful in relaxing the required tolerance of the axis of rotation to mirror facet angle (pitch angle) and rotating mirrors for optical scanners.

However, in laser scanning applications the validity of the information collected or the accuracy of the scan is directly related to the mechanical accuracy of the rotating polygonal mirror. Even when holding the facet-to-facet angular error to less than 10 arc seconds there results sufficient deterioration of the scan pitch to potentially corrupt the inspection data. This problem is further exacerbated by scan lenses which have long focal lengths and a short entrance pupil distance (facet to first element of scan lens). The passive cylindrical lens correction system exemplified by the aforementioned '135 patent does not allow for use in high resolution systems because of these problems. Another, earlier U.S. Pat. No. 3,750,189 issued to Fleischer and again assigned to the present assignee, discloses the use of a toroidal lens to permit greater pitch angle tolerances in rotating mirror scanners. However, such a toroidal lens is generally difficult and expensive to make. As such, passive correction systems have not been able to achieve high scanning accuracy without high costs, and have not been able to use "off the shelf" lenses. Furthermore, active corrective systems known in the art generally involve greater hardware costs and do not permit correction during the entire scan.

Bearing in mind the problems and deficiencies of the prior art, it is therefore an object of the present invention to provide a system and method for increasing the scan accuracy of a high or low energy radiant scanning system.

It is another object of the present invention to provide a scanning system and method which passively corrects the scanned energy beam and which can use "off the shelf" scan lens having shorter focal lengths.

It is further object of the present invention to provide a system and method for correcting the facet-to-facet error of a rotating polygonal scanning mirror.

It is yet another object of the present invention to provide a solution to the aforementioned problems at relatively low cost.

Still other objects and advantages of the invention will in part be obvious and will in part be apparent from the specification.

SUMMARY OF THE INVENTION

The above and other objects, which will be apparent to one skilled in the art, are achieved in the present invention which in one aspect relates to an optical system for a beam scanning apparatus comprising means for generating a beam of radiant energy, such as a laser beam, and a first lens having a focal length for focusing the energy beam in at least one dimension. A first mirror is adapted to rotate about an axis for deflecting and scanning the focused energy beam and a concave second mirror is adapted to reflect the focused energy beam from the rotating mirror and collimate the energy beam. The second mirror has a radius in a major axis equal to a multiple of the focal length of the first lens and a radius in a minor axis equal to a multiple of the radius in the major axis. There is also provided a second lens for focusing the collimated energy beam onto a workpiece.

In its preferred embodiment, the axis of rotation of the scanning or first mirror is non-orthogonal with respect to the direction of the energy beam from the first lens. The second mirror is oriented such that the energy beam is reflected from the second mirror in the same direction as the energy beam from the first lens. The system may include means for reversing the direction of the energy beam between the beam generating means and the first mirror such that the first mirror may be disposed adjacent to the beam generating means. The second mirror may be oriented to reverse the direction of the energy beam and be disposed adjacent to the first mirror. There may also be provided a third lens between the second mirror and the second lens for focusing the energy beam in at least one dimension.

More preferably, the second mirror is a toroidal mirror with a radius in a major axis equal to the focal length of the first lens and a radius in a minor axis equal to twice the focal length of the first lens, and is spaced from the first mirror a distance equal to the focal length of the first lens.

In another aspect, the present invention relates to a method of scanning a beam of radiant energy onto a workpiece comprising first generating a beam of collimated radiant energy and then focusing the energy beam in at least one dimension. Thereafter the focused energy beam is initially scanned and then simultaneously reflected and re-collimated. Finally, the collimated energy beam is focused onto a workpiece. Preferably, during the scanning step the energy beam is reflected so as to reverse the direction of the energy beam, and during the reflecting and re-collimating step the energy beam is reflected so as to again reverse the direction of the energy beam.

More preferably, during the reflecting and re-collimating step the energy beam is reflected using a concave mirror having a radius in a major axis equal to a multiple of the focal length of the first lens and a radius in a minor axis equal to a multiple of the radius in the major axis.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT

Figure 1:
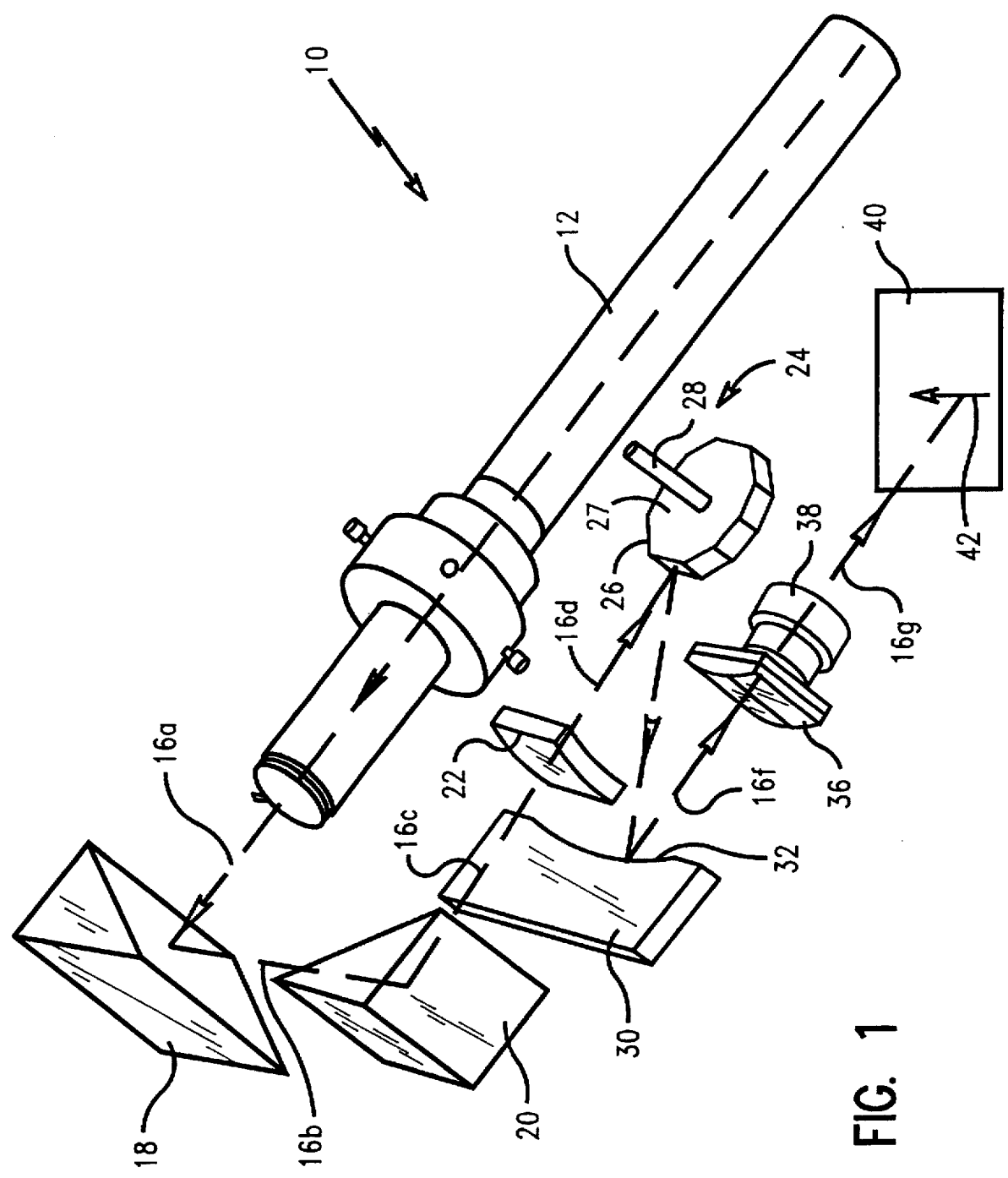
FIG. 1 is a perspective view of a preferred embodiment of the scanning system of the present invention.

In describing the preferred embodiment of the present invention, reference will be made herein to FIGS. 1 and 2 of the drawings in which like numerals refer to like features of the invention. Features of the invention are not necessarily shown to scale in the drawings. The present invention is an improvement to the scanning systems of the aforementioned U.S. Pat. Nos. 3,750,189 and 4,123,135, the disclosures of which are hereby incorporated by reference.

The present invention may be utilized to scan any high or low radiant energy beam including laser beams and the like, including helium-neon (HeNe) and argon (Ar) lasers. The scanned beam itself, may be utilized for any purpose on a workpiece, for example, data collection, photolithography or photoengraving, or for higher energy purposes such as cutting or machining a workpiece. The purpose of the scan is to be able to pass the beam across a given field while maintaining minimum spot motion in the direction perpendicular to the scanned direction.

Figure 2:
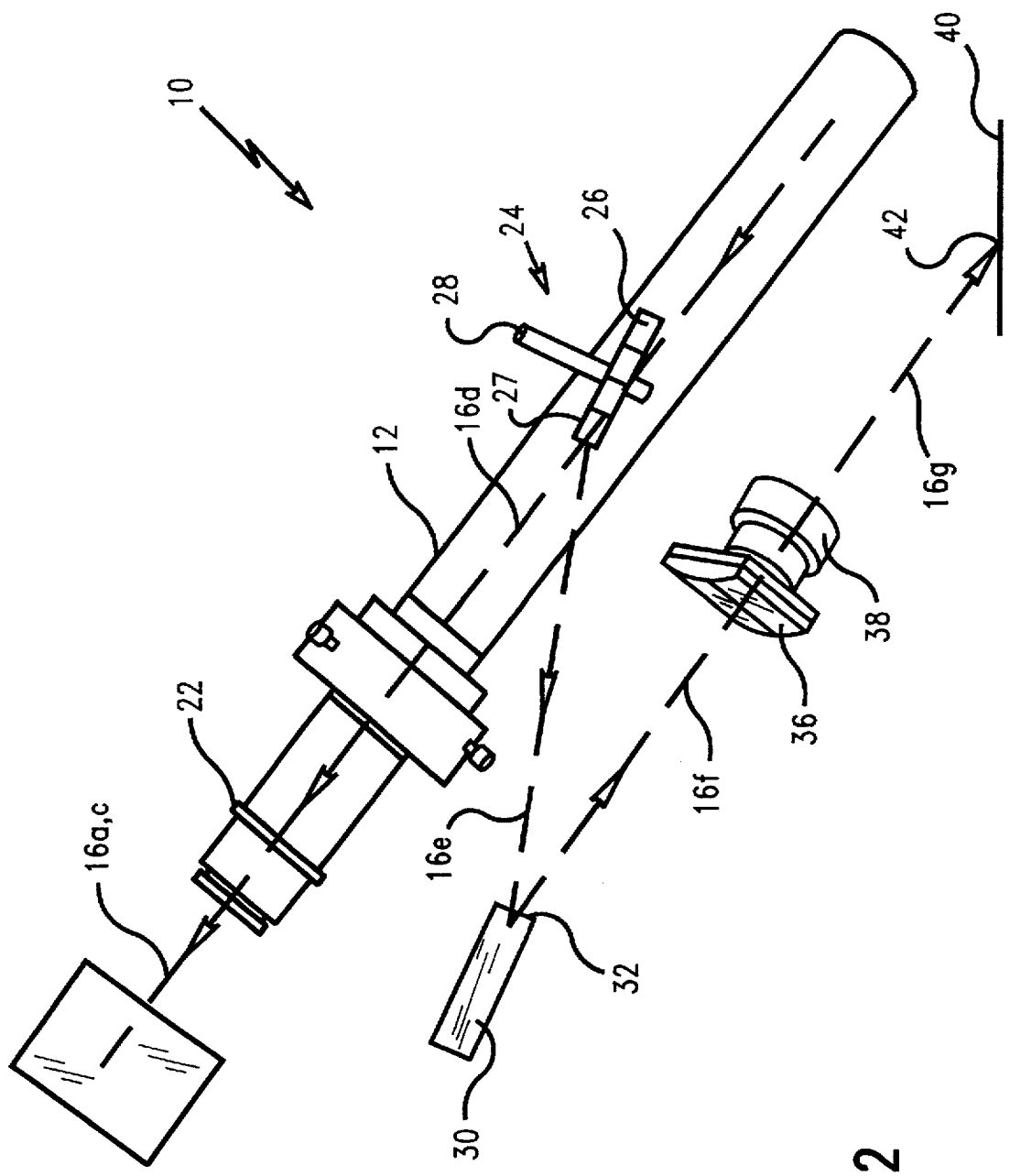
FIG. 2 is side elevational view of the preferred beam scanning system of FIG. 1.

A preferred embodiment of the scanning system 10 of the present invention is depicted in FIGS. 1 and 2 in which a beam generating means or beam source 12 is shown. Laser source 12 emits a laser or energy beam 16, which will be referred to with the subscripts a, b, c, etc. as it is processed prior to scanning on the workpiece. Initially, collimated beam 16a emitted from the laser is directed onto the surface of first fold mirror 18, at which point beam 16b is reflected 90° onto the surface of second fold mirror 20. Beam 16c is again reflected 90° and passes through a first cylindrical lens 22. This cylindrical lens may be any of the type disclosed in the prior art and has the function of focusing beam 16c in one dimension on the mirror facets of scanner or spinner 24. Cylindrical lens 22 may include a series of lenses, such as those disclosed in U.S. Pat. No. 4,123,135. Beam 16d, which emerges from cylindrical lens 22, then impinges on and is reflected from one of the mirror facets 26 on the side faces of the polygonal body 27 of spinner 24, which rotates about axis 28. As seen more clearly in the side view of FIG. 2, the axis 28 of spinner 27 is non-orthogonal (i.e., not perpendicular) to the direction of beam 16d, such that beam 16e which is reflected off mirror facets 26 is deflected outside of the plane in which lie beam segments 16a, 16b, 16c and 16d. Beam 16d strikes facet 26 at an angle of 90° in the lateral direction (as would be seen in a top-down plan view) and angled slightly in the vertical direction (as seen in side view in FIG. 2).

The present invention makes it possible to utilize cylindrical lenses in a scanning system having close facet-to-lens distances. The cylindrical lenses must have a low f-number and therefore a small depth of focus. However, the depth of focus has to be large enough to cover the change in facet location as it is rotating. In prior art scanning systems this is not possible utilizing off the shelf lenses.

In order to correct such problems, the present invention utilizes a concave, toroidal mirror which is a distance from facet 26 of spinner 27 equal to the focal length of cylindrical lens 22. The surface 32 of toroidal mirror 30 has a radius in a major axis or scanning direction equal to the focal length of cylindrical lens 22 and a radius in the minor axis or sub-scanning direction equal to twice the focal length of cylindrical lens 22. Because the focal length is one-half the radius on spherical mirrors, this results in the same focal length as lens 22. In this way, mirror 30 re-collimates the beam from the first cylindrical lens. This provides a similar degree of correction as that of the aforementioned '135 patent, although the beam will be slightly displaced. Preferably, beam 16f is parallel to the optical axis of scan lens 38. In the orthogonal direction the beam focuses at one-half the radius. This correction technique is the same but utilizes a subsequent cylindrical lens 36 which receives beam 16f with a focal length equal to that of the mirror 32 major axis in the scanning direction.

Cylindrical lens 36 has a positive shape factor (+0.5 to +1.0) to correct for coma and spherical aberration due to the scan angle. The descanning by mirror 32 provides an intersection point that is treated like the surface of polygonal spinner 24 but with the beam preferably always parallel to the optical axis. Scan lens 38 is then placed the correct distance from this intersection point. After emerging from scan lens 38, beam 16g then impinges and is scanned onto workpiece 40 along scan line 42.

In addition to its other advantages, the present invention permits the total size of the scanning apparatus to be reduced. For example, polygonal spinner 27 may be located directly adjacent to laser 12, and cylindrical lens 36 and scan lens 38 may be located below and directly adjacent spinner 27. To reduce the scan line 16g bow due to the angled entrance beam, the scan lens 38 may be sectioned to allow it be located to closer spinner 27, thus reducing the angle of the beam between beam 16e and 16f.

Thus the present invention provides a relatively low cost system and method for increasing the scan accuracy of a high or low energy radiant scanning system which passively corrects the scanned energy beam and which can use "off the shelf" scan lenses having shorter focal lengths. The system and method corrects for the facet-to-facet error of a rotating polygonal scanning mirror, thereby achieving increased tracking correction of the scanned beam.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. An optical system for a beam scanning apparatus comprising:

means for generating a beam of radiant energy;

a first lens having a focal length for focusing the energy beam in at least one dimension;

a first mirror adapted to rotate about an axis for deflecting and scanning the focused laser beam;

a concave second mirror for reflecting the focused energy beam from said rotating mirror and collimating said energy beam, said second mirror having a radius in a major axis equal to a multiple of the focal length of said first lens and a radius in a minor axis equal to a multiple of the radius in the major axis; and a second lens for focusing the collimated energy beam onto a workpiece.

2. The system of claim 1 wherein the axis of rotation of said first mirror is non-orthogonal with respect to the direction of the energy beam from said first lens.

3. The system of claim 2 wherein said second mirror is oriented such that the energy beam is reflected from said second mirror in the same direction as the energy beam from said first lens.

4. The system of claim 2 further including means for reversing the direction of said energy beam between the beam generating means and said first mirror, and wherein said first mirror is disposed adjacent to said beam generating means.

5. The system of claim 1 further wherein said second mirror is oriented to reverse the direction of said energy beam and wherein said second lens is disposed adjacent to said first mirror.

6. The system of claim 1 further including a third lens between said second mirror and said second lens for focusing the energy beam in at least one dimension.

7. The system of claim 1 wherein said second mirror is a toroidal mirror.

8. The system of claim 1 wherein said second mirror is spaced from said first mirror a distance equal to said focal length of said first lens.

9. The system of claim 1 wherein said second mirror has a radius in a major axis equal to the focal length of said first lens and a radius in a minor axis equal to twice the focal length of said first lens.

10. A scanning system for a laser beam comprising:

a source of a laser beam;

a first lens having a focal length for focusing the laser beam in at least one dimension;

a first mirror adapted to rotate about an axis for deflecting and scanning the focused laser beam;

a toroidal second mirror for reflecting the focused energy beam from said rotating mirror and collimating said laser beam, said second mirror having a radius in a major axis equal to the focal length of said first lens and a radius in a minor axis equal to twice the focal length of said first lens; and a second lens for focusing the collimated laser beam onto a workpiece.

11. The system of claim 10 wherein the axis of rotation of said first mirror is non-orthogonal with respect to the direction of the laser beam from said first lens.

12. The system of claim 11 wherein said second mirror is oriented such that the laser beam reflected from said second mirror is parallel to the direction of the laser beam from said first lens.

13. The system of claim 11 further including means for reversing the direction of said laser beam between the laser beam source and said first mirror, and wherein said first mirror is disposed adjacent to said laser beam source.

14. The system of claim 13 wherein said second mirror is oriented to reverse the direction of said laser beam and wherein said second lens is disposed adjacent to said first mirror.

15. The system of claim 14 further including a third lens between said second mirror and said second lens for focusing the laser beam in at least one dimension.

16. The system of claim 15 wherein said second mirror is spaced from said first mirror a distance equal to said focal length of said first lens.

17. A method of scanning a beam of radiant energy onto a workpiece comprising the steps of:

a) generating a beam of collimated radiant energy;

b) focusing the energy beam, by a first lens having a focal length, in at least one dimension;

c) thereafter scanning the focused energy beam;

d) thereafter simultaneously reflecting and recollimating said energy beam using a concave mirror having a radius in a major axis equal to a multiple of the focal length of said first lens and a radius in a minor axis equal to a multiple of the radius in the major axis; and e) thereafter focusing the collimated energy beam onto a workpiece.

18. The method of claim 17 wherein during step (c) said energy beam is deflected so as to reverse the direction of said energy beam.

19. The method of claim 18 wherein during step (d) said energy beam is reflected so as to again reverse the direction of said energy beam.

* * * * *